United States Patent [19]

Donecker

[11] 4,126,498
[45] Nov. 21, 1978

[54] BOOTS FOR WIRE ROPE TERMINATIONS
[75] Inventor: Fred W. Donecker, Madison, Conn.
[73] Assignee: United States Steel Corporation, Pittsburgh, Pa.
[21] Appl. No.: 835,467
[22] Filed: Sep. 21, 1977
[51] Int. Cl.² .............................................. B29C 27/00
[52] U.S. Cl. ........................................ 156/86; 29/447; 24/115 R; 264/230; 285/381
[58] Field of Search ........................... 24/115 R, 122.6; 29/447; 177/DIG. 2; 339/DIG. 1; 285/381, DIG. 20; 403/273; 264/230, DIG. 71; 156/86

[56] References Cited
U.S. PATENT DOCUMENTS

| 3,024,047 | 3/1962 | Schmoll | 285/DIG. 10 |
| 3,423,518 | 1/1969 | Weagant | 339/DIG. 1 |
| 3,549,183 | 12/1970 | Smollinger | 24/125 |
| 3,672,712 | 6/1972 | Davis | 24/122.6 |
| 3,705,445 | 12/1972 | Smollinger | 24/123 |
| 3,990,661 | 11/1976 | Groel | 285/381 X |

Primary Examiner—Leon Gilden
Attorney, Agent, or Firm—Frank Madonia; Rea C. Helm

[57] ABSTRACT

A lightweight, easily-installed boot for wire rope terminations is water-tight and adaptable to a variety of wire rope terminations. The boot is placed on the surface of a wire rope and secured to the socket nose of the termination to seal the termination-wire rope interface; then, a polyolefin heat shrinkable tube is placed over the head of the boot to seal the wire rope-boot interface.

6 Claims, 4 Drawing Figures

BOOTS FOR WIRE ROPE TERMINATIONS

BACKGROUND OF THE INVENTION

This invention relates to dampening the vibrations associated with the use of wire rope in industrial applications. More particularly, this invention relates to apparatus for reducing both fatigue and corrosion of wire rope terminations.

The term wire rope is generally understood to comprise a symmetrically arranged and helically twisted assembly of strands. A strand, in turn, is a symmetrically arranged and helically twisted assembly of individual wires. For simplicity, the term wire rope as used herein will include strand, as well.

Wire rope is designed and constructed to transmit forces longitudinally along its axis. It must be able to withstand destructive forces, such as tensile loading, bending fatigue, lateral crushing, abrasive wear, and corrosion, which act upon it during service. This invention is primarily concerned with bending fatigue and corrosion.

While wire rope is recognized in industry as a widely applicable structural member possessing high-strength and flexibility, it is also recognized that it is only as strong as its weakest link. this weakest link is often the area in the vicinity of the fittings. Fittings, or terminations as they are known in the art, are accessories used as attachments for wire rope. The stresses and strains to which wire rope is subjected are generally concentrated at such fittings.

Devices such as flared metal dampener clamps, have been used in an attempt to decrease the vibrations and thereby reduce the fatigue stresses in the wire rope at the terminations. However, such clamps do little more than transfer the fatigue point from one point in the termination to another equally vulnerable point, with little improvement in fatigue resistance.

Corrosion, another of the destructive forces, can occur as a result of the exposure of wire rope to moisture, acids, alkali, and the like, [either in the atmosphere or in hydrospace]. In oceanographic applications, wire rope is particularly susceptible to destruction by corrosion. In fact, experience has shown that because of the environment of the ocean, the effect of corrosion and fatigue operating together is greater than the effect of the sum of the effect of each. Prior art dampener clamps, have been found to be essentially ineffective in preventing either corrosion or fatigue in hydrospace.

SUMMARY OF THE INVENTION

According to the present invention a boot for wire rope terminations is fabricated of an insulative or non-conductive material and provided with seals for the wire rope-termination interface, the boot-termination interface, and the wire rope-boot interface. Through the use of this boot a positive attachment of the boot to the termination is made possible. It is lightweight, is simple to use, provides a complete seal for the termination, may be removed and reinstalled for inspection purposes, and may be adapted to many types of fittings.

DETAILED DESCRIPTION OF THE INVENTION

Figure 1:
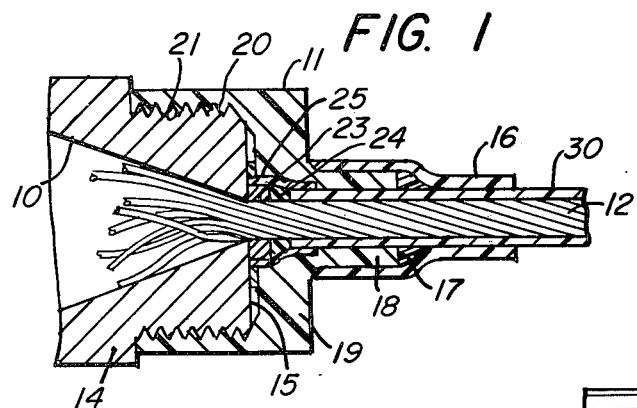
FIG. 1 is a longitudinal cross-sectional view of a wire rope termination of the hot metal type with a boot constructed in accordance with a first embodiment of the present invention.
Figure 2:
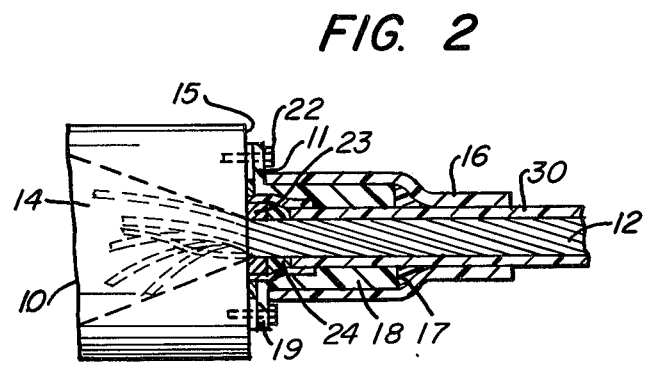
FIG. 2 is also a longitudinal cross-sectional view of a wire rope termination of the hot metal type but with a boot constructed in accordance with a second embodiment of the present invention.

In the embodiment of the invention depicted in FIG. 1, a zinc socket termination 10 with a boot 11 made in accordance with this invention is shown installed on the end section of a wire rope 12. The termination 10 comprises a bail (not shown) and a socket 14. The bail is an open or closed "U-shaped" member which provides the attachment means for the wire rope. As shown, socket 14 may be provided with a conical opening into which a wire rope end section is inserted and secured to the socket. Any of the conventional methods for effecting such securing may be utilized. For example, molten metal such as zinc may be poured into the opening and solidified, a wedge-type socket may be utilized or the shank of the fitting may be cold-formed or swaged to the wire rope. However, irrespective of the manner in which the rope and section is secured, in this embodiment of the invention the socket nose 15 is connected to the boot by means mated thread portions. FIG. 2 illustrative of an alternative means for connecting the boot to the termination, wherein the flange portion of the boot is firmly bolted to the front face of the termination.

Figure 3A:
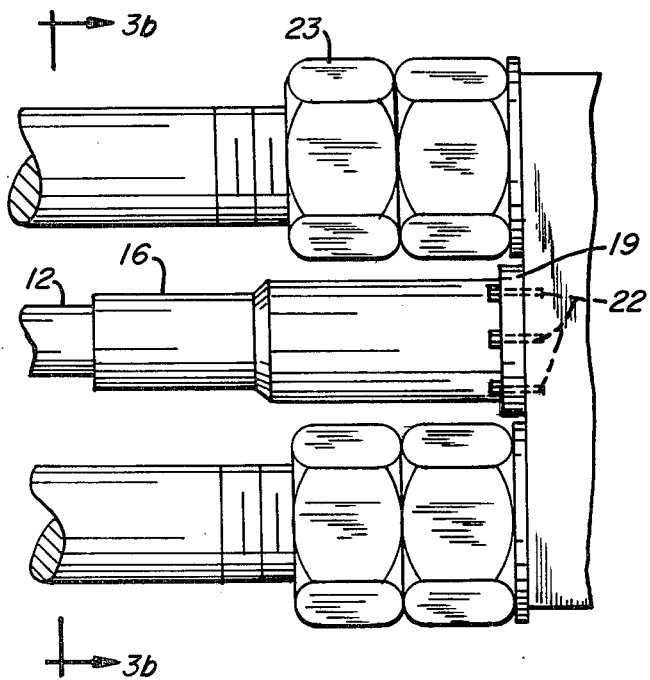
FIGS. 3a and b are an elevation view and an end view, respectively, of a boot according to a third embodiment of the present invention installed on a bridge-type wire rope termination.
Figure 3B:
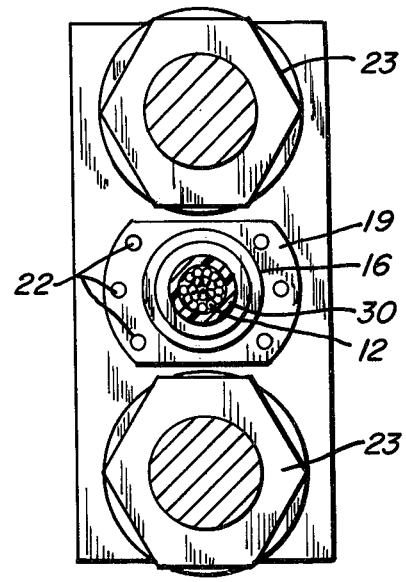

The installation of the boot 11 is begun before the termination 10 is attached to the wire rope 12. Prior to the insertion of the end section of the wire rope into the termination, a tube 16 of heat shrinkable plastic is passed over the end section a sufficient distance from the end to allow room for the other elements to be placed on the rope. Next, the wire rope is inserted into the leading end 17 of the boot 11. The boot comprises a tubular portion 18 and a flange portion 19 at the trailing end thereof. The tubular portion has an inner diameter designed to provide a tight fit around the circumferential surface of the wire rope. Its effective outer diameter is designed to be smaller than the inner diameter of the heat shrinkable tube so that the tube may be slipped over the tube-like portion of the boot. Although the tube-like portion of the boot shown in the figures to have a circular cross-section, it will be readily apparent that its outer surface need not be circular. For example, the outer surface may be elliptical, rectangular, hexagonal, etc. Whatever the shape of the tube-like outer surface, it is required that the largest diametrical distance (eg. the diagonal, if a square outer surface is employed) or the effective outer diameter be smaller than the inner diameter of the heat-shrinkable plastic tube. The flange 19 is integral with and surrounding the outer surface of the trailing end of the tube-like portion 18. In the FIG. 1 embodiment of the invention, the flange 19 is integral with cap 20, having internal threads therein which mate with the external threads 21 on the socket nose. In the FIG. 2 embodiment, the flange 19 has been drilled to receive bolts 22 for securing it to the socket nose. This embodiment is particularly useful in connection with terminations which generally have a limited amount of space available for installing a boot, eg. such as bridge terminations. A bridge termination is shown in an elevation view in FIG. 3a and an end view in FIG. 3b. In this embodiment the flange 19 has a configuration which allows the boot to be attached to the socket nose 15 between the adjusting bolts and nuts 23.

After the end section is secured, the flange 19 is connected to the socket nose to make a fluid-tight seal between the socket nose 15 and the flange 19. Referring to FIG. 1, teflon tape may be placed on the external threads 21 of the socket nose to help provide the proper seal. Other common gasket materials may be used in similar manner to enhance sealing. The heat shrinkable tube 16 is then placed over the tube-like portion 18 of the boot. The tube 16 should be of sufficient length to partially cover the tube-like portion 18 so as to extend over the leading end 17 of the boot and to cover the wire rope, as well. Finally, the tube 16 is heated to shrink it into sealing position on the wire rope and the leading end of the boot, so as to provide a fluid-tight seal.

While the boot 11 may be constructed so that the junction of the wire rope 12 and the zinc slip 23 may be sealed merely by the connection of the boot to the socket, it may be advantageous to provide for enhanced sealing of the junction, eg. by placing mastic or other sealing material at this junction before the boot is secured to the socket nose. Thus, when the boot is secured, the pressure of the boot against the socket nose causes the mastic to spread out and fill even the slightest imperfection in the fit and insure a positive seal. Similarly, mastic may also be placed around the wire rope at the lead-end of the boot 17 to insure a positive seal at the boot-wire rope interface. In oceanographic applications or other applications where extremely high fluid pressures are encountered, it will be advantageous to substitute hot welds or O-rings for the mastic at the zinc slip and at the boot head.

The figures also illustrate the use of the boot in connection with a wire rope having an extruded plastic jacket 30, a portion of which has been cut away to allow the rope to be splayed. After the rope is secured in the termination, the bare portions of the wire rope may again be jacketed by placing mastic in the gap 24 between the zinc slip 23 and the cut away end of the jacket 30. Polyvinylchloride tape 25 or the like may then be wrapped around the gap to retain the mastic.

I claim:

1. In the method of attaching a termination to the end section of a wire rope, wherein said section is inserted into the socket portion of said termination and secured within said socket, the improvement which comprises:
    a prior to insertion into the termination
      1. passing a tube of heat shrinkable plastic over said end section a distance sufficiently removed from the terminus thereof;
      2. inserting the end section into the head of a boot, said boot comprising
         (i) a tube-like portion having an inner diameter tightly fitting the circumferential surface of said end section and an effective outer diameter smaller than the inner diameter of said heat shrinkable tube, and
         (ii) a flange portion integral with and surrounding the trailing end of said tube-like portion, and
    (b) after securing the end section in the socket
      3. connecting said boot flange portion and said socket so that the interface thereof is sealed
      4. sliding said heat shrinkable tubing over the tube-like portion of said boot so that the interface of the lead end of the boot and wire rope is covered by said heat shrinkable tubing and
      5. heating shrinking said heat shrinkable tubing so that the interface of said boot and said wire rope is sealed.

2. The improvement according to claim 1 wherein the end of said socket has external threads, said flange portion of said boot has internal threads mating thereto.

3. The improvement according to claim 1 wherein mastic is applied to the interface of said boot and said wire rope prior to heat shrinking said tubing.

4. The improvement according to claim 1 wherein mastic is applied to the inteface of said socket and said wire rope prior to connecting said boot flange portion and said socket.

5. The improvement according to claim 1 wherein an O-ring tightly fitting said wire rope is positioned at the interface of said boot and said wire rope prior to heat shrinking said tubing.

6. The improvement according to claim 1 wherein an O-ring tightly fitting said wire rope is positioned at the interface of said socket and said wire rope prior to connecting said boot flange portion and said socket.

* * * * *